(12) United States Patent
Jaradi et al.

(10) Patent No.: US 12,017,605 B2
(45) Date of Patent: Jun. 25, 2024

(54) SLIDABLE SEATBELT ASSEMBLY FOR A WHEELCHAIR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 17/932,406

(22) Filed: Sep. 15, 2022

(65) Prior Publication Data
US 2024/0092311 A1 Mar. 21, 2024

(51) Int. Cl.
*A61G 3/08* (2006.01)
*B60R 22/06* (2006.01)
*B60R 22/20* (2006.01)

(52) U.S. Cl.
CPC .......... *B60R 22/203* (2013.01); *A61G 3/0808* (2013.01); *B60R 22/06* (2013.01); *B60R 2022/207* (2013.01)

(58) Field of Classification Search
CPC .. A61G 3/0808; B60R 22/203; B60R 22/206; B60R 22/22; B60R 22/24; B60R 2022/207
See application file for complete search history.

(56) References Cited

U.S. PATENT DOCUMENTS

| 3,833,239 | A | * | 9/1974 | Coenen | B60R 22/06 280/804 |
| 4,193,614 | A | * | 3/1980 | Felsing | B60R 22/06 297/469 |
| 4,359,236 | A | * | 11/1982 | Rogers, Jr. | B60R 22/06 297/483 |
| 4,437,683 | A | | 3/1984 | Moriya et al. | |
| 4,478,432 | A | | 10/1984 | Matsuoka et al. | |
| 5,026,093 | A | * | 6/1991 | Nishikaji | B60R 22/24 242/384.5 |
| 6,676,056 | B2 | * | 1/2004 | Peter | B60R 22/44 242/390.8 |

(Continued)

FOREIGN PATENT DOCUMENTS

| DE | 3223020 A1 * | 12/1983 | ........... B60R 22/201 |
| GB | 2200529 A * | 8/1988 | ........... A61G 3/0808 |

(Continued)

*Primary Examiner* — Amy R Weisberg
*Assistant Examiner* — Matthew D Lee
(74) *Attorney, Agent, or Firm* — Frank A. MacKenzie; Bejin Bieneman PLC (57) ABSTRACT

An assembly includes a vehicle roof and a vehicle floor spaced from the vehicle roof. The assembly includes a seatbelt assembly for accommodating a wheelchair. The seatbelt assembly is slidably supported by the vehicle roof and the vehicle floor. The seatbelt assembly is slidable along the vehicle roof and the vehicle floor along a vehicle-longitudinal axis. The seatbelt assembly has a seatbelt webbing elongated in a direction from the vehicle roof to the vehicle floor. The assembly includes a seatbelt buckle slidably supported by the vehicle floor. The seatbelt buckle is slidable relative to the vehicle floor along the vehicle-longitudinal axis.

20 Claims, 8 Drawing Sheets

(56) References Cited

U.S. PATENT DOCUMENTS

| | | |
|---|---|---|
| 8,157,292 B2 | 4/2012 | You et al. |
| 10,933,839 B2 | 3/2021 | Jaradi et al. |
| 11,590,921 B1 * | 2/2023 | Farooq ................. A61G 3/0808 |
| 2022/0096289 A1 | 3/2022 | Jaradi et al. |
| 2022/0134991 A1 * | 5/2022 | Farooq .................. B60R 21/214 |
| | | 280/730.1 |

FOREIGN PATENT DOCUMENTS

| | | | | |
|---|---|---|---|---|
| GB | 2221379 A | * | 2/1990 | ............. B60R 22/06 |
| JP | 55132341 A | * | 10/1980 | ............. B60R 22/06 |
| JP | 2016128301 A | * | 7/2016 | ............. B60R 22/22 |
| WO | WO-9202389 A1 | * | 2/1992 | ........... A61G 3/0808 |

* cited by examiner

SLIDABLE SEATBELT ASSEMBLY FOR A WHEELCHAIR

BACKGROUND

Accommodations for wheelchairs in vehicles are typically installed with aftermarket modifications to a production vehicle. For example, a vehicle may be modified with a lift or the like to load a wheelchair onto a vehicle. Production vehicles typically do not have the ability to accommodate the wheelchair of an occupant in a manner allowing the occupant to sit in the wheelchair in the vehicle, or if they do, significant aftermarket modification is required. For example, seatbelt systems of vehicles are not typically able to accommodate an occupant seated in a wheelchair in the vehicle.

DETAILED DESCRIPTION

An assembly includes a vehicle roof and a vehicle floor spaced from the vehicle roof. The assembly includes a seatbelt assembly slidably supported by the vehicle roof and the vehicle floor. The seatbelt assembly is slidable along the vehicle roof and the vehicle floor along a vehicle-longitudinal axis. The seatbelt assembly has a seatbelt webbing elongated in a direction from the vehicle roof to the vehicle floor. The assembly includes a seatbelt buckle slidably supported by the vehicle floor. The seatbelt buckle is slidable relative to the vehicle floor along the vehicle-longitudinal axis.

The seatbelt assembly may include a seatbelt retractor and the seatbelt webbing is retractably extendable from the seatbelt retractor. The seatbelt retractor may be slidably supported by the vehicle roof and slidable relative to the vehicle roof along the vehicle-longitudinal axis.

The seatbelt assembly may include an anchor fixed to the seatbelt webbing. The anchor may be slidably supported by the vehicle floor and slidable relative to the vehicle floor along the vehicle-longitudinal axis.

The seatbelt assembly may include a clip supported on the seatbelt webbing between the anchor and the seatbelt retractor, the clip being engageable with the seatbelt buckle.

The assembly may include a wheelchair-seating area between the seatbelt buckle and the seatbelt retractor. The seatbelt webbing may extend across the wheelchair-seating area when the clip is engaged with the seatbelt buckle.

The assembly may include a motor operatively coupled to the anchor.

The vehicle roof may include a first track and the vehicle floor includes a second track. The seatbelt assembly may be slidable along the first track and the second track.

The vehicle floor may include a third track spaced cross-vehicle from the second track. The seatbelt buckle may be slidable along the third track.

The assembly may include a wheelchair-seating area between the second track and the third track.

The vehicle roof includes a first track and the vehicle floor includes a second track. The seatbelt assembly includes a seatbelt retractor and the seatbelt webbing is retractably extendable from the seatbelt retractor. The seatbelt retractor is slidably supported by the first track and slidable relative to the vehicle roof along the first track along the vehicle-longitudinal axis. The seatbelt buckle is slidably supported by the second track and slidable relative the vehicle floor along the second track along the vehicle-longitudinal axis.

The vehicle floor may include a third track spaced cross-vehicle from the second track and the seatbelt assembly may include an anchor fixed to the seatbelt webbing. The anchor may be slidably supported by the third track and slidable relative to the vehicle floor along the third track along the vehicle-longitudinal axis.

The third track may be vehicle-outboard of the second track.

The seatbelt assembly may be slidable along the vehicle roof and the vehicle floor to a position corresponding to a position of a wheelchair along the vehicle-longitudinal axis.

The seatbelt buckle may be spaced cross-vehicle from the seatbelt assembly.

The assembly may include a lock engageable with the seatbelt assembly and a second lock engageable with the seatbelt buckle.

The assembly may include a motor operatively coupled to the seatbelt buckle.

The assembly may include a second seatbelt assembly slidably supported by the vehicle roof and the vehicle floor. The second seatbelt assembly may be spaced cross-vehicle from the seatbelt assembly and the second seatbelt assembly being slidable along the vehicle roof and the vehicle floor along a vehicle-longitudinal axis. The assembly may include the second seatbelt assembly having a second seatbelt webbing elongated from the vehicle roof to the vehicle floor.

The assembly may include a computer including a processor and a memory storing instructions executable by the processor to identify a position of a wheelchair along the vehicle-longitudinal axis, slide the seatbelt assembly along the vehicle-longitudinal axis to a position corresponding to the position of the wheelchair, and slide the seatbelt buckle along the vehicle-longitudinal axis to the position corresponding to the position of the seatbelt assembly.

The instruction may include to lock the seatbelt assembly in the position corresponding to the position of the wheelchair.

The instructions may include to lock the seatbelt buckle in the position corresponding to the position of the seatbelt assembly.

With reference to the Figures, wherein like numerals indicate like parts throughout the several views, an assembly 10 for a vehicle 12 includes a vehicle roof 14 and a vehicle floor 16 spaced from the vehicle roof 14. The assembly 10 includes a seatbelt assembly 18 slidably supported by the vehicle roof 14 and the vehicle floor 16. The seatbelt assembly 18 is slidable along the vehicle roof 14 and the vehicle floor 16 along a vehicle-longitudinal axis L. The seatbelt assembly 18 has a seatbelt webbing 20 elongated in a direction from the vehicle roof 14 to the vehicle floor 16. The assembly 10 includes a seatbelt buckle 22 slidably supported by the vehicle floor 16. The seatbelt buckle 22 is slidable relative to the vehicle floor 16 along the vehicle-longitudinal axis L.

The seatbelt assembly 18 and the seatbelt buckle 22 are slidable along the vehicle roof 14 and vehicle floor 16 to move the seatbelt assembly 18 and the seatbelt buckle 22 to a position that corresponds to a position of a wheelchair in the vehicle 12. The wheelchair may be present in the vehicle 12 along the vehicle-longitudinal axis L and the seatbelt assembly 18 and the seatbelt buckle 22 may be moved to match the wheelchair. An occupant of the wheelchair may manually engage the seatbelt assembly 18 with the seatbelt buckle 22 and the seatbelt assembly 18 may maintain the occupant in the wheelchair in the event of sudden deceleration of the vehicle 12.

Figure 1:
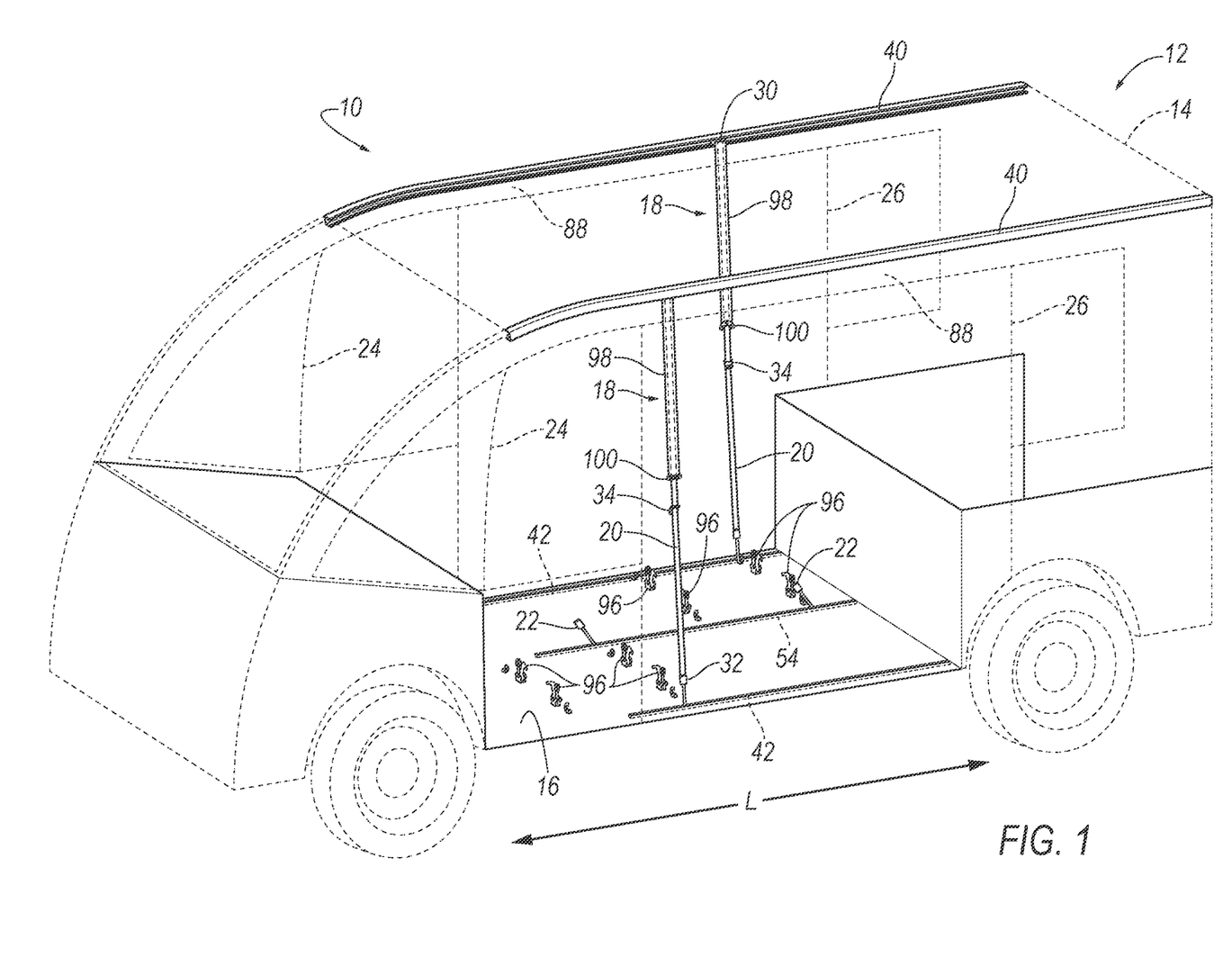
FIG. 1 is a perspective view of a vehicle having slidable seatbelt assembly and seatbelt buckle.
Figure 2:
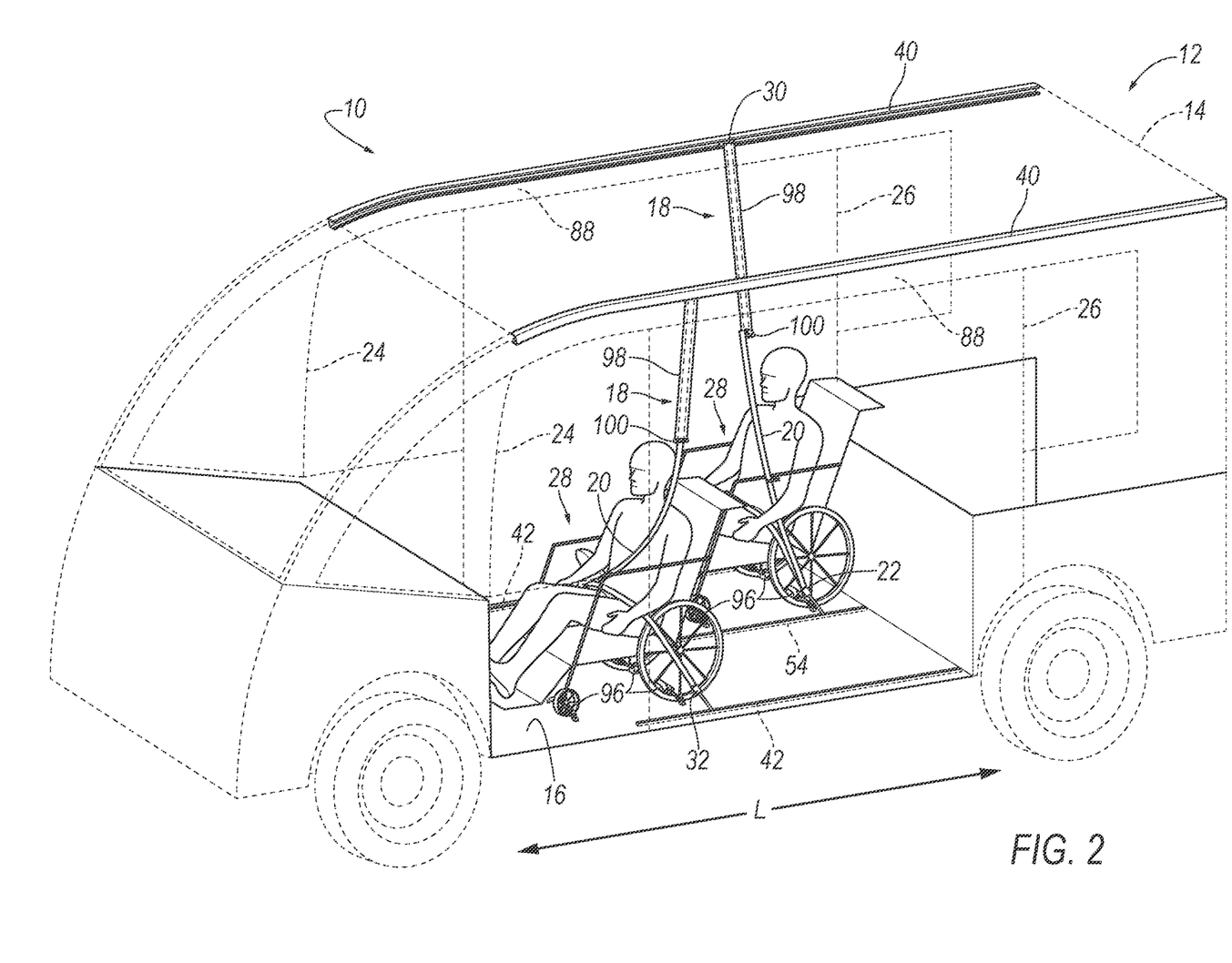
FIG. 2 is a perspective view of the vehicle with the seatbelt assembly and seatbelt buckle adjacent a wheelchair in the vehicle.

With reference to FIGS. 1 and 2, the vehicle 12 may be any suitable type of ground vehicle, e.g., a passenger or commercial automobile such as a sedan, a coupe, a truck, a sport utility, a crossover, a van, a minivan, a taxi, a bus, etc.

The vehicle 12 defines a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 includes a vehicle body (not numbered). The vehicle body includes body panels partially defining an exterior of the vehicle 12. The body panels may present a class-A surface, e.g., a finished surface exposed to view by a customer and free of unaesthetic blemishes and defects. The body panels include, e.g., a roof 14, etc.

The vehicle body includes the vehicle roof 14 and the vehicle floor 16. The vehicle body, specifically the vehicle roof 14, includes two roof rails 88. The roof rails 88 are spaced from one another in a cross-vehicle direction. The roof rails 88 each extend longitudinally along the vehicle body, i.e., along a vehicle-longitudinal axis L.

The vehicle body may include pillars 24, 26 spaced from each along the vehicle-longitudinal axis L on both sides of the vehicle body. Specifically, the vehicle body includes a front pillar 24, e.g., an A-pillar, and a rear pillar 26 (which may be referred to as a C-pillar even in examples where there is no B-pillar) spaced vehicle-rearward from the front pillar 24 on each side of the vehicle body. For example, the vehicle body includes a front pillar 24 and a rear pillar 26 on each side of the vehicle 12 with the front pillar 24 being spaced from the rear pillar 26. In other words, the front pillar 24 may be disposed at the front end of the passenger compartment. The pillars 24, 26 may extend from the vehicle roof 14 to the vehicle floor 16. The vehicle 12 may include other pillars in addition to the front pillar 24 and the rear pillar 26. For example, as shown in the Figures, the vehicle 12 may include a D-pillar disposed at the rear end of the passenger compartment on each side of the vehicle 12.

With continued reference to FIGS. 1 and 2, the vehicle body includes rockers (not numbered) extending from the front pillar 24 to the rear pillar 26. Specifically, the vehicle body may include two rockers, one on each side of the vehicle body. The rockers are elongated along the vehicle-longitudinal axis L. The vehicle 12 may include two rockers, i.e., one rocker on either side of the passenger compartment.

The rockers are spaced from the roof rails 88 below the roof rails 88. The rockers are below the passenger compartment. In some examples, the rockers may be connected to the pillars 24, 26 in any suitable way, e.g., welding, adhesive, fasteners, etc. In other words, in such examples, the rockers and the pillars 24, 26 are separate from each other and connected to each other. In other examples, the rockers may be unitary with the pillars 24, 26, i.e., a single, uniform piece of material with no seams, joints, fasteners, or adhesives holding it together. In such an example, the pillars 24, 26 and the rocker may be formed together simultaneously as a single continuous unit, e.g., by molding, forging, casting, stamping, etc. The vehicle floor 16 may be supported by the rockers.

The vehicle roof 14 and the vehicle floor 16 spaced from the vehicle roof 14. Specifically, the vehicle floor 16 is spaced downwardly from the vehicle roof 14. The vehicle roof 14 defines the upper boundary of the passenger compartment and may extend from the front end of the passenger compartment to the rear end of the passenger compartment. The vehicle roof 14 may include a roof panel extending from one roof rail 88 to the other roof rail 88. The roof panel may be irremovably fixed to the roof rails 88. In other words, the roof panel is secured to the roof rails 88 in such a way that removal requires destruction such as cutting, e.g., cutting material and/or welded joints, etc. As an example, the roof panel may be attached to both roof rails 88, e.g., by welding, fasteners, etc.

The vehicle floor 16 defines the lower boundary of the passenger compartment and may extend from the front end of the passenger compartment to the rear end of the passenger compartment. The vehicle floor 16 may include a floor panel (not numbered) and upholstery on the floor panel, for example, carpet, and may have a class-A surface facing the passenger compartment, i.e., a surface specifically manufactured to have a high quality, finished, aesthetic appearance free of blemishes. The roof panel and the floor panel may be, for example, a suitable metal such as steel or aluminum or a suitable polymer such as fiber-reinforced plastic.

The vehicle 12 includes a plurality of doors (not numbered), e.g., a front door and a rear door on each side of the vehicle body, movable from a closed position to an open position for vehicle 12 occupants to enter and exit a passenger compartment. The front door may be supported by the front pillar 24 and the rear door may be supported by the rear pillar 26 in the door opening. In the closed position, the doors are in at least one of the door openings in the vehicle body. The first door and the second door are both in the single door opening in the vehicle body. In the open position, at least one of the door openings in the vehicle body may be exposed.

With continued reference to FIGS. 1 and 2, the vehicle body may not include a middle pillar between the front pillar 24 and the rear pillar 26, i.e., the vehicle body may not include a middle pillar, e.g., a B-pillar, between the front pillar 24 and the rear pillar 26 from the vehicle floor 16 to the vehicle roof 14. In other words, the vehicle body is B-pillarless. The vehicle body lacking a middle pillar allows for a door opening, i.e., an opening to receive one or more of the doors, to extend from the front pillar 24 to the rear pillar 26. The door opening extending from the front pillar 24 to the rear pillar 26 allows occupants easier access to the passenger compartment for ingress and egress.

The passenger compartment defines a wheelchair-seating area 28. The wheelchair-seating area 28 is the area occupied by an occupant properly seated in a wheelchair in the passenger compartment. The wheelchair-seating area 28 is adjacent the seatbelt assembly 18 when the seatbelt assembly 18 is in the deployed position. Specifically, the wheelchair-seating area 28 is vehicle-inboard of the seatbelt assembly 18. The wheelchair-seating area 28 position may be adjusted depending on the position of the wheelchair in the passenger compartment.

The vehicle 12 may include a plurality of latches 96 supported by the vehicle floor 16. The latches 96 may engage wheels of the wheelchair to lock the wheels of the wheelchair relative to the vehicle floor 16, including along the vehicle-longitudinal axis L. The latches 96 may be anchored to the vehicle floor 16 and may retractably extend through the wheels of the wheelchair. The vehicle 12 may include any suitable number of latches 96 for the number of wheelchairs that may be accommodated by the vehicle 12. For example, as shown in the Figures, the vehicle 12 may include eight latches 96, four latches 96 per wheelchair that may be in the vehicle 12. In other examples, the vehicle 12 may include more latches 96 than shown in the Figures or fewer latches 96 than shown in the Figures. The latches 96 may be any suitable type of latches 96. For example, as shown in the Figures, the latches 96 may be of the type that are manually operated by an occupant of the wheelchairs. In other examples, the latches 96 may be of the type that are electronically operated, e.g., solenoid, to latch 96 the wheels of the wheelchair, e.g., through a human-machine interface such as a button, switch, touch-screen, etc.

Figure 3:
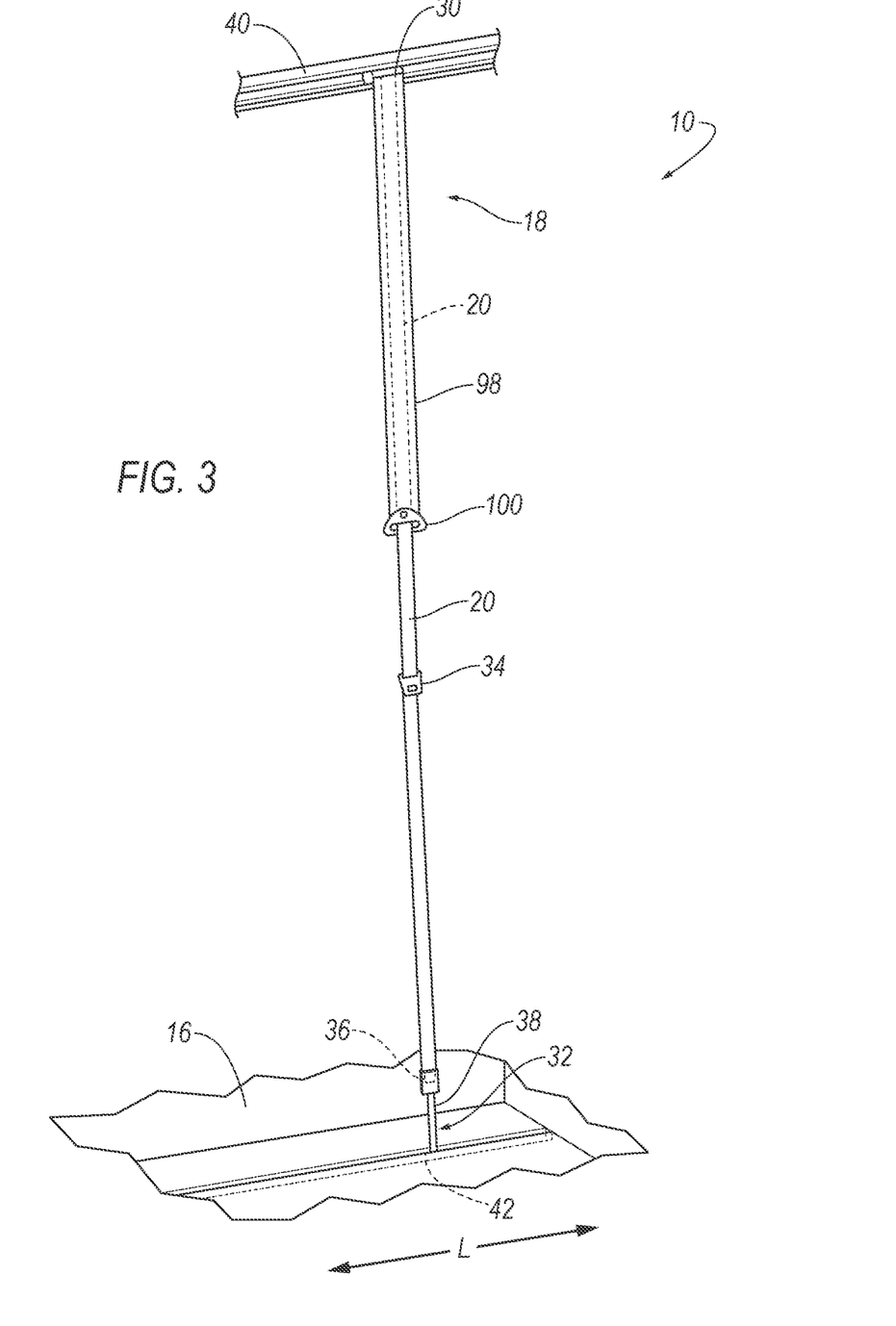
FIG. 3 is a perspective view of the seatbelt assembly.

With reference to FIGS. 1-3, the assembly 10 includes the seatbelt assembly 18. The seatbelt assembly 18 includes a seatbelt retractor 30 and the seatbelt webbing 20 retractably extendable from the seatbelt retractor 30. The seatbelt assembly 18 may include an anchor 32 coupled to the seatbelt webbing 20, and a clip 34 that is engageable with the seatbelt buckle 22. The clip 34 is supported on the seatbelt webbing 20 between the anchor 32 and the seatbelt retractor 30.

Figure 5:
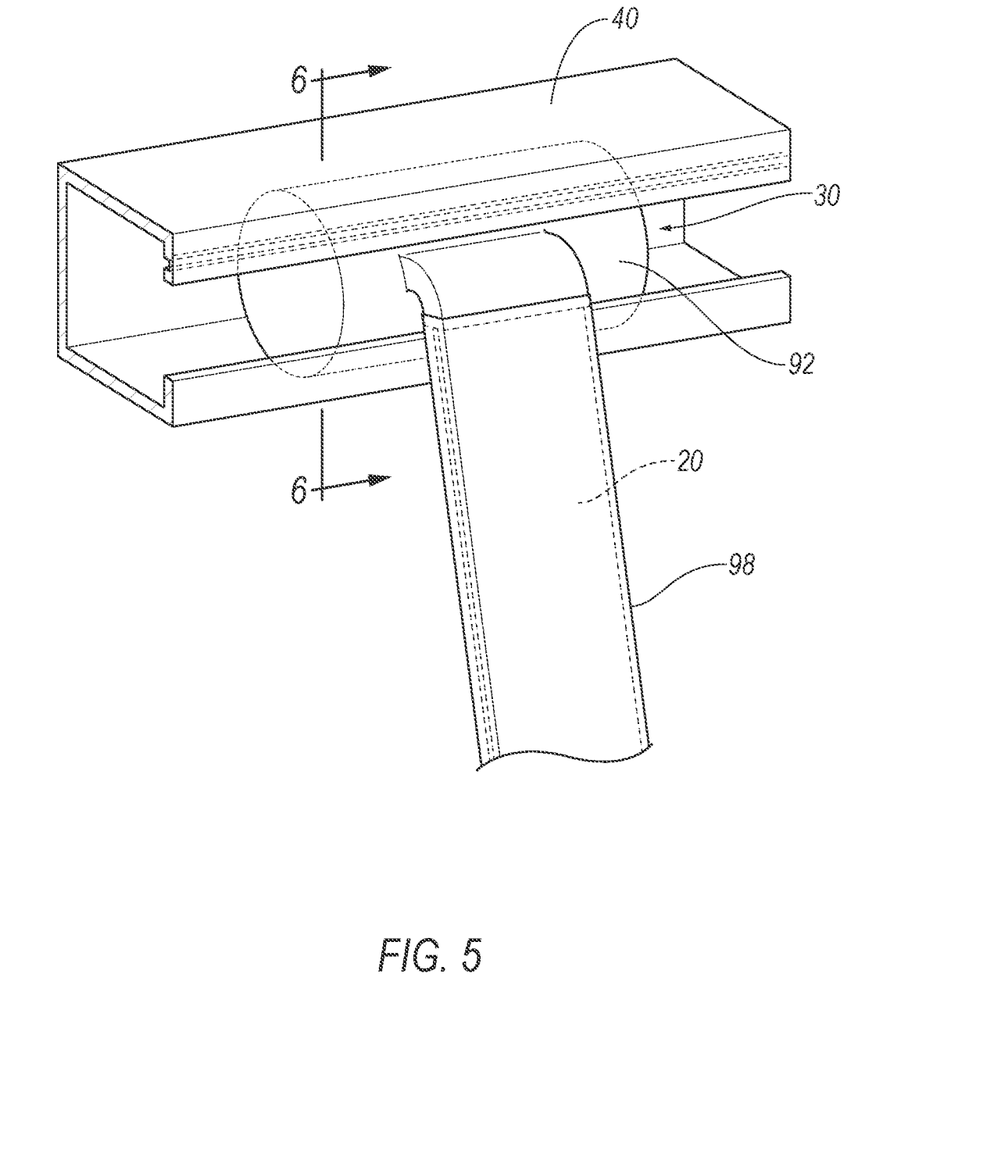
FIG. 5 is a perspective view of a seatbelt retractor of the seatbelt assembly.

The seatbelt retractor 30 includes a housing 92 and a spool 94 rotatably supported by the housing 92. The seatbelt webbing 20 is coiled about the spool 94. The seatbelt webbing 20 may be fabric, e.g., polyester. The clip 34 slides freely along the seatbelt webbing 20 and, when engaged with the seatbelt buckle 22, divides the seatbelt webbing 20 into a lap band and a shoulder band.

The spool 94 is selectively rotatable relative to the housing 92 to pay out and retract the seatbelt webbing 20 relative to the spool 94. The spool 94 may be spring-loaded relative to the housing 92, e.g., with a spring between the spool 94 and the housing 92, to automatically retract slack from the seatbelt webbing 20.

The spool 94 may be lockable from an unlocked position to a locked position, e.g., with a locking device (not shown) moveable relative to the housing 92 and the spool 94 between the unlocked position and the locked position. With the spool 94 in the unlocked position, the seatbelt webbing 20 may be extended from and retracted into the seatbelt retractor 30. In other words, the seatbelt webbing 20 may be coiled and uncoiled freely about the spool 94. With the spool 94 in the locked position, the seatbelt retractor 30 controls extension of the seatbelt webbing 20 to control the kinematics of the occupant. Specifically, the spool 94 is locked relative to the housing 92. In some examples, the seatbelt retractor 30 may include a torsion bar, load limiter, etc., including known structures, which allows for a limited amount of payout of the seatbelt webbing 20. The spool 94 may be in the unlocked position by default, i.e., in the absence of a sudden deceleration. The spool 94 may change from the unlocked position to the locked position during a sudden deceleration of the vehicle 12, i.e., the deceleration may trigger components of the seatbelt retractor 30, e.g., the locking device, to change from the unlocked position to the locked position, e.g., the spool 94.

As one example, the locking device may engage the spool 94 in response to deceleration of the vehicle 12, e.g., a sudden slowing of the vehicle 12, sudden stop, vehicle impact, etc. In other words, the locking device may be moved from the unlocked position to the locked position by a change in inertia. The locking device may engage the spool 94 in response to an activation sensor (not shown). The activation sensor senses sudden deceleration of the vehicle 12 and triggers activation of the locking device, i.e., moves the locking device to the locked position. As one example, the activation sensor may be in the seatbelt retractor 30 and may be, for example, a weighted pendulum, a centrifugal clutch, or any other suitable type. As an example shown in the Figures, the second end of the spool 94 may include teeth and the locking device may include a pawl that releasably engages the teeth. Specifically, the activation sensor, when triggered, moves the pawl into engagement with the teeth. The activation sensor triggers the pawl to disengage the teeth to selectively release the spool 94 from the locked position to the unlocked position in response to predetermined activity, e.g., by a change in inertia.

In some examples, such as shown in the Figures, the seatbelt assembly 18 may include a sleeve 98 elongated downwardly from the seatbelt retractor 30. The sleeve 98 positions the seatbelt webbing 20 to extend across the wheelchair-seating area 28 and the occupant to control the kinematics of the occupant in the event of a vehicle impact. The sleeve 98 defines a hole (not numbered) and the seatbelt webbing 20 is elongated from the seatbelt retractor 30 through the hole of the sleeve 98. The seatbelt webbing 20 may freely slide through the sleeve 98. For example, as the occupant moves the clip 34 to engage the clip 34 with the seatbelt buckle 22, the seatbelt webbing 20 may uncoil from the spool 94 and move freely through the sleeve 98. The length of the sleeve 98 may be adjusted based on a distance between the occupant and the vehicle roof 14. In other examples, such as examples not shown in the Figures, the seatbelt assembly 18 may not include a sleeve 98.

In some examples, such as shown in the Figures, the seatbelt assembly 18 may include a guide 100 engaged with the seatbelt webbing 20. Specifically, the guide 100 may be supported by the sleeve 98 at an end adjacent the wheelchair-seating area 28. For example, the seatbelt webbing 20 may freely slide through the guide 100. In other words, the seatbelt webbing 20 may extend from the anchor 32 through the guide 100 to the seatbelt retractor 30. The guide 100 may be spaced from the seatbelt retractor 30 by the sleeve 98. For example, the guide 100 may be disposed between the seatbelt retractor 30 and the anchor 30. The guide 100 guides the seatbelt webbing 20 across the wheelchair-seating area 28 to the seatbelt buckle 22 when the clip 34 is engaged with the seatbelt buckle 22.

The seatbelt buckle 22 releasably engages the clip 34, and specifically a latch plate (not numbered) of the clip 34. The seatbelt buckle 22 may include, for example, a slot (not numbered), a latch (not shown), a release button (not numbered), or other suitable structure. The release button may be spring loaded, as is known. The latch plate may be engaged with the seatbelt buckle 22 upon insertion into the slot. For example, the clip 34 may engage an opening defined by the latch plate and inhibit removal of the latch plate from the slot. Actuation of the release button may disengage the latch plate from the seatbelt buckle 22. For example, depression of the release button may disengage the seatbelt buckle 22 from the opening defined by the latch plate and permit removal of the latch plate from the slot.

The seatbelt buckle 22 is slidably supported by the vehicle floor 16 vehicle-inboard of the seatbelt assembly 18. The wheelchair-seating area 28 is between the seatbelt assembly 18 and the seatbelt buckle 22. The seatbelt webbing 20 extends across the wheelchair-seating area 28 when the clip 34 is engaged with the seatbelt buckle 22.

The seatbelt assembly 18 may be disposed adjacent a wheelchair in the vehicle 12. The seatbelt assembly 18, when fastened, retains the occupant on the wheelchair, e.g., during sudden decelerations of the vehicle 12. The seatbelt webbing 20 may extend from the seatbelt retractor 30 to the anchor 32. Specifically, the seatbelt webbing 20 may be elongated in a direction from the vehicle roof 14 to the vehicle floor 16. For example, one end of the seatbelt webbing 20 feeds into the seatbelt retractor 30, and the other end of the seatbelt webbing 20 is fixed to the anchor 32. The seatbelt webbing 20 may be releasably fixed to the anchor 32. For example, the seatbelt assembly 18 may include a second clip 36 and a second buckle 38 engageable with the second clip 36. The second clip 36 and the second buckle 38 act as the anchor 32 when the second clip 36 is engaged with the second buckle 38. The seatbelt webbing 20 is releasably fixed to allow occupants and the wheelchairs to be loaded into the passenger compartment, e.g., ingress and egress of the vehicle 12.

The seatbelt webbing 20 may be fabric, e.g., woven polyester. The seatbelt assembly 18 may be a three-point harness, meaning that the seatbelt webbing 20 is attached at three points around the occupant when fastened the anchor 32, the seatbelt retractor 30, and the seatbelt buckle 22. The seatbelt assembly 18 may, alternatively, include another arrangement of attachment points.

With continued reference to FIGS. 1-3, the seatbelt assembly 18 is operable to be positioned adjacent one or more wheelchairs in the passenger compartment. Specifically, the seatbelt assembly 18 is slidable between the front pillar 24 and the rear pillar 26. The seatbelt webbing 20 is elongated from the vehicle floor 16 to the vehicle roof 14 between the front pillar 24 and the rear pillar 26. The seatbelt assembly 18 is movable between the front pillar 24 and the rear pillar 26. Specifically, the seatbelt assembly 18 is slidably supported by the vehicle floor 16 and the vehicle roof 14 along the vehicle-longitudinal axis L. The seatbelt assembly 18 is slidable along the vehicle-longitudinal axis L relative to the vehicle floor 16 and the vehicle roof 14. In other words, the seatbelt assembly 18 may move in a vehicle-forward direction and in a vehicle-rearward direction along the vehicle roof 14 and the vehicle floor 16. The seatbelt retractor 30 is slidably supported by the vehicle roof 14 and the anchor 32 is slidably supported by the vehicle floor 16. In other words, the seatbelt retractor 30 is slidable relative to the vehicle roof 14 along the vehicle-longitudinal axis L and the anchor 32 is slidable relative to the vehicle floor 16 along the vehicle-longitudinal axis L.

The seatbelt assembly 18 is slidable along one or more door openings of the vehicle 12, e.g., adjacent the door openings. When the doors are in the closed position, the seatbelt assembly 18 is slidable along the doors adjacent the seatbelt assembly 18. The seatbelt assembly 18 is slidable from a stowed position to a deployed position. The deployed position corresponding to a position of a wheelchair once the wheelchair is in the vehicle 12. In other words, the seatbelt assembly 18 is slidable along the vehicle roof 14 and the vehicle floor 16 to a position corresponding to a position of a wheelchair along the vehicle-longitudinal axis L. The position corresponding to the wheelchair may vary depending on the position of the wheelchair in the vehicle 12 along the vehicle-longitudinal axis L. The seatbelt assembly 18 may be in the stowed position when the vehicle 12 is parked or not in use and the seatbelt assembly 18 may be in the deployed position when the vehicle 12 is going to be moving along a roadway. The stowed position may allow the occupant to enter and exit the vehicle 12 and may allow the wheelchair to be moved into and out of the vehicle 12.

As discussed above, the seatbelt assembly 18 is slidable along the vehicle floor 16 and the vehicle roof 14. The vehicle 12 may include tracks 40, 42, 54 that the seatbelt assembly 18 is slidable along. Specifically, the vehicle roof 14 includes a first track 40 and the vehicle floor 16 includes a second track 42. The seatbelt assembly 18 is slidable along the first track 40 and the second track 42 to the deployed position, i.e., a position corresponding to the position of the wheelchair. The first track 40 and the second track 42 are both elongated along the vehicle-longitudinal axis L.

Figure 4:
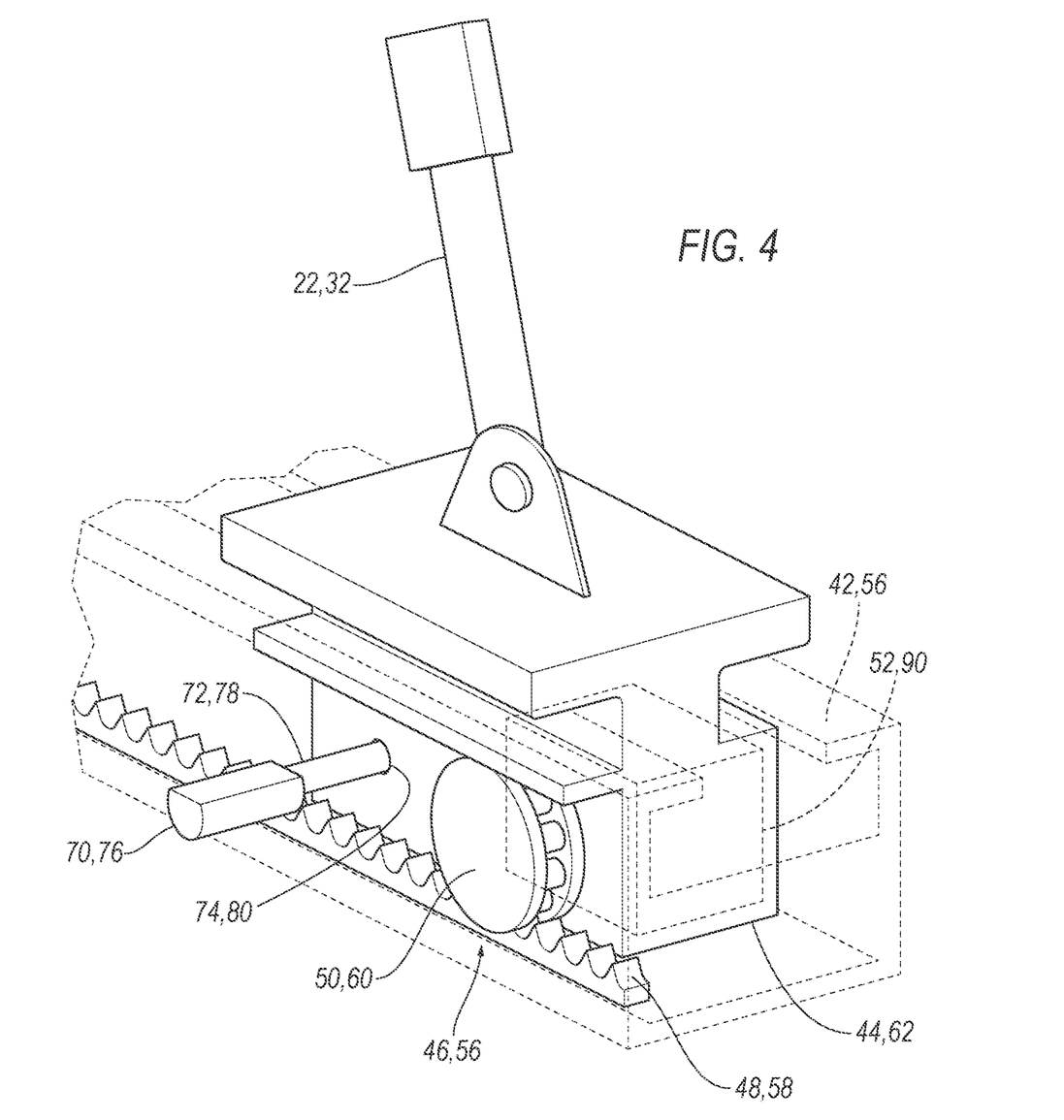
FIG. 4 is a perspective view of an anchor and a seatbelt buckle of the seatbelt assembly.

With reference to FIG. 4, the seatbelt retractor 30 is slidably supported by the first track 40. Specifically, the seatbelt retractor 30 is slidable relative to the vehicle roof 14 along the first track 40 and along the vehicle-longitudinal axis L. The anchor 32 is slidably supported by the second track 42. Specifically, the anchor 32 is slidable relative to the vehicle floor 16 along the second track 42 and along the vehicle-longitudinal axis L. The assembly 10 may include an anchor carrier 44 slidable along the second track 42 with the anchor 32 fixed to the anchor carrier 44. The assembly 10 may include one or more linear actuators 46, 56 fixed to one or more of the tracks 40, 42, 54 and drivably coupled to the seatbelt assembly 18 to slide the seatbelt assembly 18 along the tracks 40, 42, 54.

The assembly 10 may include a first linear actuator 46 coupled to the anchor 32 on the second track 42 to slide the seatbelt assembly 18 along the vehicle-longitudinal axis L. In such an example, as the anchor 32 moves along the second track 42, the seatbelt retractor 30 is pulled along the first track 40. In other words, the entire seatbelt assembly 18 is moved along the tracks 40, 42, 54 by the first linear actuator 46 coupled to the anchor 32. In other examples, the assembly 10 may include another linear actuator coupled to the seatbelt retractor 30, i.e., on the first track 40, to move both the anchor 32 and the seatbelt retractor 30 along the tracks 40, 42, 54. In the example shown in FIG. 4, the first linear actuator 46 includes a first rack 48 and first pinion 50 to move the seatbelt assembly 18 along the first track 40 and the second track 42. The assembly 10 may include an anchor motor 52 operatively coupled to the anchor 32 to move the anchor 32 along the second track 42. Specifically, the first linear actuator 46 may include the anchor motor 52 that rotates the first pinion 50 to move along the first rack 48, and in turn, moving the seatbelt assembly 18 along the second track 42. In other examples, the first linear actuator 46 may include other components, e.g., a chain, a worm gear, a piston, etc., to move the seatbelt assembly 18 along the tracks 40, 42, 54. The first linear actuator 46 may include any suitable type of components to move the seatbelt assembly 18 along the tracks 40, 42, 54.

The vehicle floor 16 may include a third track 54 spaced cross-vehicle from the seatbelt assembly 18. Specifically, the third track 54 is spaced cross-vehicle from the first track 40 and the second track 42. The third track 54 is vehicle-inboard of the seatbelt assembly 18 and, specifically, the third track 54 is vehicle-inboard of the first track 40 and the second track 42. The wheelchair-seating area 28 is between the seatbelt assembly 18 and the third track 54. Specifically, the wheelchair-seating area 28 is between the second track 42 and the third track 54. In other words, the wheelchair-seating area 28 is between the anchor 32 and the seatbelt buckle 22. The seatbelt buckle 22 is slidable along the third track 54. The seatbelt buckle 22 may be slidable along the third track 54 to a deployed position, i.e., a position corresponding to the position of the wheelchair in the passenger compartment so that the seatbelt assembly 18 is operable to control the kinematics of the occupant of the wheelchair. When an occupant is in the wheelchair in the vehicle 12, the seatbelt assembly 18 moves along the first track 40 and the second track 42 to a position corresponding to the position of the wheelchair and the buckle moves along the third track 54 to a position corresponding to the position of the wheelchair. As in the example of the Figures, the assembly 10 may include a buckle carrier 62 slidable along the third track 54 with the seatbelt buckle 22 fixed to the buckle carrier 62.

With reference to FIG. 4, the assembly 10 may include a second linear actuator 56 fixed to the third track 54 and drivably coupled to the seatbelt buckle 22 to slide the seatbelt buckle 22 along the third track 54. Like the second linear actuator 56 fixed to the second track 42 shown in FIG. 5, the second linear actuator 56 fixed to the third track 54 may include a second rack 58 and second pinion 60 to move the seatbelt buckle 22 along the third track 54. The second linear actuator 56 may include a buckle motor 90 that rotates the second pinion 60 to move along the second rack 58, and, in turn, move the buckle along the third track 54. FIG. 4 is representative of the second track 42, third track 54, the anchor carrier 44, the buckle carrier 62, and the linear actuators 46, 56 to slide the seatbelt buckle 22 and the anchor 32. In both examples, the motors 52, 90, i.e., anchor motor 52 and the buckle motor 90, may both be supported by the carriers 44, 62.

Figure 6A:
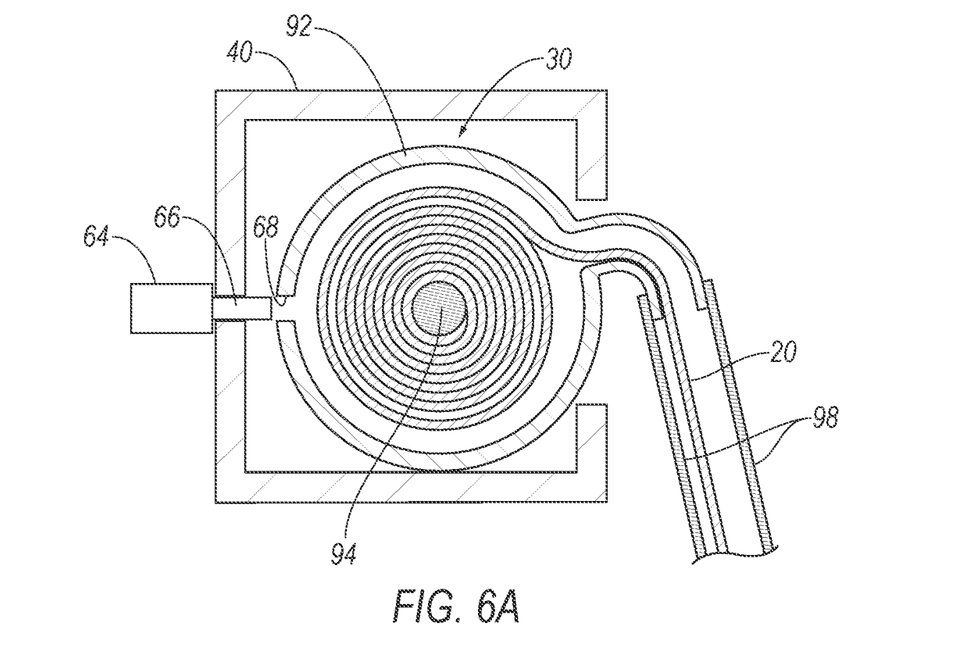
FIG. 6A is a cross-sectional view through line 6 of a track of the vehicle in an unlocked position.
Figure 6B:
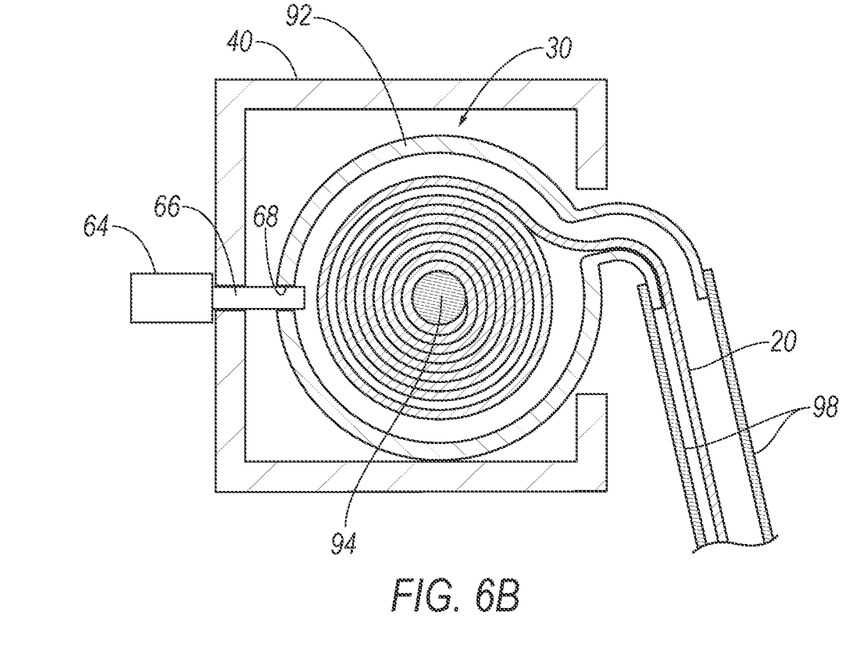
FIG. 6B is a cross-sectional view through line 6 of the track of the vehicle in a locked position.

With reference to FIGS. 6A and 6B, the assembly 10 may include a lock 64 engageable with the seatbelt assembly 18. The lock 64 limits the movement of the seatbelt assembly 18 along the tracks 40, 42, 54 in the event of sudden deceleration of the vehicle 12. For example, as shown in the Figures, the lock 64 may include a peg 66 receivable by a hole 68 in the seatbelt retractor 30 to lock 64 the seatbelt retractor 30 along the track in the event of sudden deceleration of the vehicle 12. For example, a solenoid may move the peg 66 into and out of the hole 68 in the seatbelt retractor 30. In other examples, the seatbelt assembly 18 may include any suitable type of lock 64 to limit movement of the seatbelt assembly 18 along the tracks 40, 42, 54.

With reference to FIG. 4, the assembly 10 may include a second lock 70 engageable with the seatbelt buckle 22 and a third lock 76 engageable with the anchor 32. Specifically, the carriers 44, 62 may be lockable to the second track 42 and the third track 54. The second lock 70 limits the movement of the seatbelt buckle 22 in the second track 42 and the third lock 76 limits the movement of the anchor 32 in the second track 42 in the event of sudden deceleration of the vehicle 12. For example, the second lock 70 includes a second peg 72 receivable by a second hole 74 in the anchor carrier 44 and the third lock 76 includes a third peg 78 receivable by a third hole 80 in the buckle carrier 62 to limit movement of the seatbelt buckle 22 in the third track 54 and the anchor 32 in the second track 42. For example, a solenoid may move the second peg 72 and the third peg 78 into and out of the holes 68, 80 in the carriers 44, 62. As discussed above, the example shown in FIG. 4 is representative of the second track 42, third track 54, the anchor carrier 44, the buckle carrier 62, and the linear actuators 46, 56 to slide the seatbelt buckle 22 and the anchor 32.

Once the seatbelt assembly 18 and the seatbelt buckle 22 have each reached the positions corresponding to the position of the wheelchair, the occupant of the wheelchair may manually engage the clip 34 of the seatbelt assembly 18 with the seatbelt buckle 22 to extend the seatbelt webbing 20 across the wheelchair-seating area 28.

The vehicle 12 may include any suitable number of seatbelt assemblies 18. In the example shown in the Figures, the vehicle 12 includes two seatbelt assemblies 18. In such an example, the second seatbelt assembly 18 is spaced cross-vehicle from the seatbelt assembly 18. The vehicle 12 may include more seatbelt assemblies 18 than shown in the Figures or less seatbelt assemblies 18 than shown in the Figures. The second seatbelt assembly 18 may be identical to the seatbelt assembly 18. In other words, the seatbelt assemblies 18 may include the same components and operate in the same way.

Figure 7:
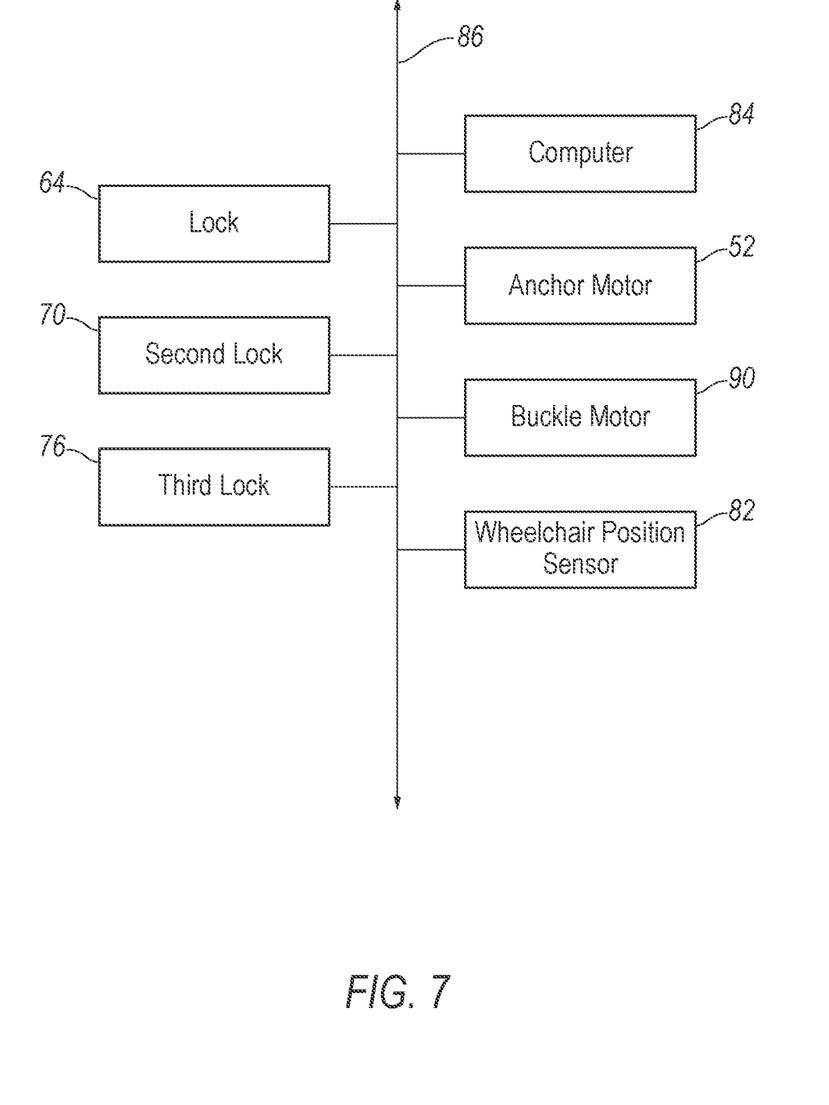
FIG. 7 is a block diagram of a vehicle communication network of the vehicle.

The vehicle 12 may include wheelchair position sensors 82 to identify the presence and a position of a wheelchair in the vehicle 12. The wheelchair position sensors 82 may be in communication with a computer 84 of the vehicle 12. The wheelchair position sensors 82 may send a signal to the computer 84 to indicate that a wheelchair is present in the vehicle 12 and the position of the wheelchair along the vehicle-longitudinal axis L. The wheelchair position sensors 82 may be any suitable type of sensors, e.g., weight sensors, cameras, etc.

The computer 84 includes a processor and a memory. The memory includes one or more forms of computer 84 readable media, and stores instructions executable by the computer 84 for performing various operations, including as disclosed herein. The computer 84 may be a restraints control module. The computer 84 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 84 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 84.

The memory can be of any type, e.g., hard disk drives, solid state drives, servers, or any volatile or non-volatile media. The memory can store the collected data sent from the sensors. The memory can be a separate device from the computer 84, and the computer 84 can retrieve information stored by the memory via a network in the vehicle 12, e.g., over a CAN bus, a wireless network, etc. Alternatively or additionally, the memory can be part of the computer 84, e.g., as a memory of the computer 84. The computer 84 may include programming to operate one or more of vehicle 12 brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 84, as opposed to a human operator, is to control such operations. Additionally, the computer 84 may be programmed to determine whether and when a human operator is to control such operations. The computer 84 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

With reference to FIG. 7, the computer 84 is generally arranged for communications on a vehicle communication network 86 that can include a bus in the vehicle 12 such as a controller area network CAN or the like, and/or other wired and/or wireless mechanisms. Alternatively or additionally, in cases where the computer 84 actually comprises a plurality of devices, the vehicle communication network 86 may be used for communications between devices represented as the computer 84 in this disclosure. Further, as mentioned below, various controllers and/or sensors may provide data to the computer 84 via the vehicle communication network 86.

Figure 8:
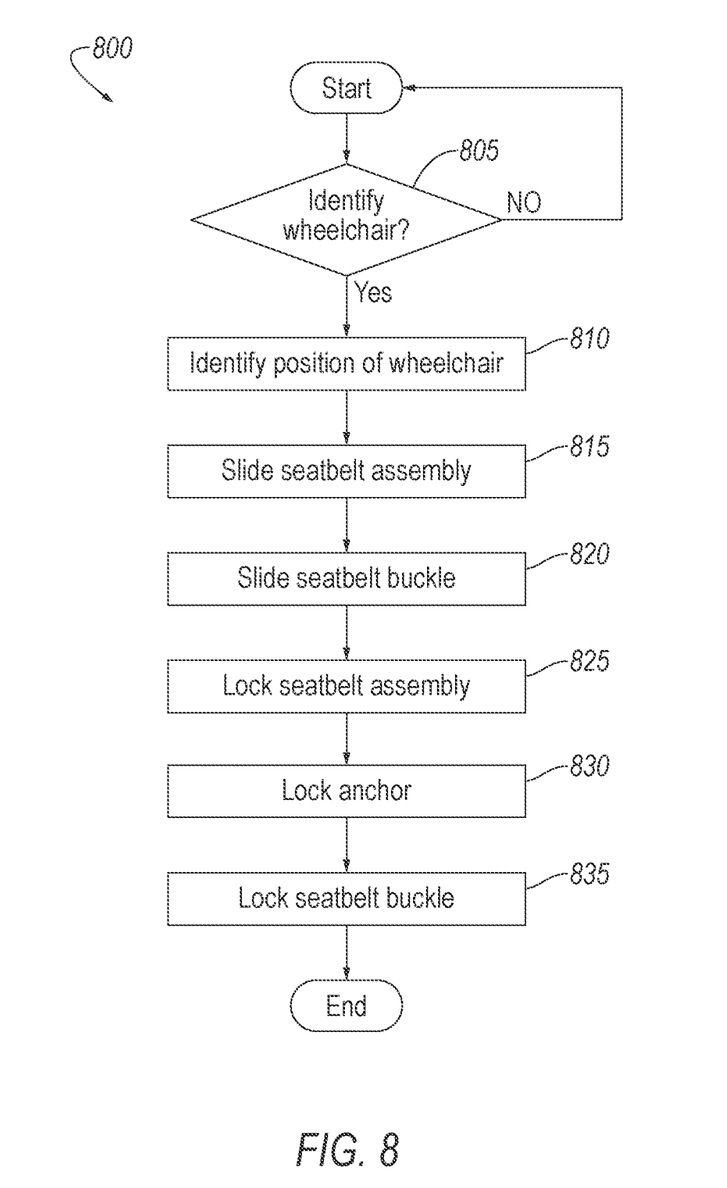
FIG. 8 is a flowchart of a method for moving the seatbelt assembly and buckle to a position corresponding to a position of a wheelchair.

With reference to FIG. 8, the computer 84 stores instructions to control components of the vehicle 12 according to the method 800. Specifically, as shown in FIG. 8, the computer 84 executes the instructions to move the seatbelt assembly 18, the seatbelt buckle 22, and locks 64. Use of "in response to," "based on," and "upon determining" herein, including with reference to method 800, indicates a causal relationship, not merely a temporal relationship.

With reference to decision block 805, the method 800 includes identifying the presence of a wheelchair in the vehicle 12. The wheelchair position sensor 82 may identify the presence to the wheelchair. If a wheelchair is identified in the vehicle 12, the method 800 moves to block 810. If no wheelchair is identified, the method 800 returns to start.

With reference to block 810, the method 800 includes identifying a position of a wheelchair along the vehicle-longitudinal axis L. The wheelchair position sensor 82 may identify the position of the wheelchair along the vehicle-longitudinal axis L.

With reference to block 815, the method 800 includes sliding the seatbelt assembly 18 along the vehicle-longitudinal axis L to a position corresponding to the position of the wheelchair. The motor coupled to the anchor 32 may initiate to move the seatbelt assembly 18 along the first track 40 and the second track 42 to the position corresponding to the position of the wheelchair.

With reference to block 820, the method 800 includes sliding the seatbelt buckle 22 along the vehicle-longitudinal axis L to the position corresponding to the position of the seatbelt assembly 18 and wheelchair. The motor coupled to the buckle may initiate to move the seatbelt buckle 22 along the third track 54 to the position corresponding to the position of the wheelchair.

With reference to block 825, the method 800 includes locking the seatbelt assembly 18 in the position corresponding to the position of the wheelchair. The post of the lock 64 may be moved into the hole 68 in the seatbelt retractor 30 to lock 64 the seatbelt retractor 30 along the first track 40.

With reference to block 830, the method 800 includes locking the anchor 32 in the position corresponding to the position of the wheelchair. The second peg 72 may be moved into the second hold to lock 64 the anchor 32 along the second track 42.

With reference to block 835, the method 800 includes locking the seatbelt buckle 22 in the position corresponding to the position of the wheelchair. The second may be moved into the second hole 74 to lock 64 the seatbelt buckle 22 along the third track 54.

The adjectives first, second, and third relating to the tracks 40, 42, 54 are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle roof and a vehicle floor spaced from the vehicle roof;
   a seatbelt assembly slidably supported by the vehicle roof and the vehicle floor, the seatbelt assembly being slidable along the vehicle roof and the vehicle floor along a vehicle-longitudinal axis;
   the seatbelt assembly having a seatbelt webbing elongated in a direction from the vehicle roof to the vehicle floor; and
   a seatbelt buckle slidably supported by the vehicle floor, the seatbelt buckle being slidable relative to the vehicle floor along the vehicle-longitudinal axis;
   the seatbelt assembly including a seatbelt retractor and the seatbelt webbing being retractably extendable from the seatbelt retractor, the seatbelt retractor being slidably supported by the vehicle roof and slidable relative to the vehicle roof along the vehicle-longitudinal axis.

2. The assembly of claim 1, wherein the seatbelt assembly includes an anchor fixed to the seatbelt webbing, the anchor being slidably supported by the vehicle floor and slidable relative to the vehicle floor along the vehicle-longitudinal axis.

3. The assembly of claim 2, wherein the seatbelt assembly includes a clip supported on the seatbelt webbing between the anchor and the seatbelt retractor, the clip being engageable with the seatbelt buckle.

4. The assembly of claim 3, further comprising a wheelchair-seating area between the seatbelt buckle and the seatbelt retractor, the seatbelt webbing extending across the wheelchair-seating area when the clip is engaged with the seatbelt buckle.

5. The assembly of claim 2, further comprising a motor operatively coupled to the anchor.

6. The assembly of claim 1, wherein the vehicle roof includes a first track and the vehicle floor includes a second track, the seatbelt assembly being slidable along the first track and the second track.

7. The assembly of claim 6, wherein the vehicle floor includes a third track spaced cross-vehicle from the second track, the seatbelt buckle being slidable along the third track.

8. The assembly of claim 7, further comprising a wheelchair-seating area between the second track and the third track.

9. The assembly of claim 1, wherein:
   the vehicle roof includes a first track and the vehicle floor includes a second track;

the seatbelt retractor is slidably supported by the first track and slidable relative to the vehicle roof along the first track along the vehicle-longitudinal axis; and the seatbelt buckle is slidably supported by the second track and slidable relative to the vehicle floor along the second track along the vehicle-longitudinal axis.

10. The assembly of claim 9, wherein:

the vehicle floor includes a third track spaced cross-vehicle from the second track; and the seatbelt assembly includes an anchor fixed to the seatbelt webbing, the anchor being slidably supported by the third track and slidable relative to the vehicle floor along the third track along the vehicle-longitudinal axis.

11. The assembly of claim 10, wherein the third track is vehicle-outboard of the second track.

12. The assembly of claim 1, wherein the seatbelt assembly is slidable along the vehicle roof and the vehicle floor to a position corresponding to a position of a wheelchair along the vehicle-longitudinal axis.

13. The assembly of claim 1, wherein the seatbelt buckle is spaced cross-vehicle from the seatbelt assembly.

14. The assembly of claim 1, further comprising a lock engageable with the seatbelt assembly and a second lock engageable with the seatbelt buckle.

15. The assembly of claim 1, further comprising a motor operatively coupled to the seatbelt buckle.

16. The assembly of claim 1, further comprising:

a second seatbelt assembly slidably supported by the vehicle roof and the vehicle floor, the second seatbelt assembly being spaced cross-vehicle from the seatbelt assembly and the second seatbelt assembly being slidable along the vehicle roof and the vehicle floor along a vehicle-longitudinal axis; and the second seatbelt assembly having a second seatbelt webbing elongated from the vehicle roof to the vehicle floor.

17. The assembly of claim 1, further comprising a computer including a processor and a memory storing instructions executable by the processor to:

identify a position of a wheelchair along the vehicle-longitudinal axis;

slide the seatbelt assembly along the vehicle-longitudinal axis to a position corresponding to the position of the wheelchair; and slide the seatbelt buckle along the vehicle-longitudinal axis to the position corresponding to the position of the seatbelt assembly.

18. An assembly comprising:

a vehicle roof and a vehicle floor spaced from the vehicle roof;

a seatbelt assembly slidably supported by the vehicle roof and the vehicle floor, the seatbelt assembly being slidable along the vehicle roof and the vehicle floor along a vehicle-longitudinal axis;

the seatbelt assembly having a seatbelt webbing elongated in a direction from the vehicle roof to the vehicle floor;

a seatbelt buckle slidably supported by the vehicle floor, the seatbelt buckle being slidable relative to the vehicle floor along the vehicle-longitudinal axis; and a computer including a processor and a memory storing instructions executable by the processor to:

identify a position of a wheelchair along the vehicle-longitudinal axis;

slide the seatbelt assembly along the vehicle-longitudinal axis to a position corresponding to the position of the wheelchair; and slide the seatbelt buckle along the vehicle-longitudinal axis to the position corresponding to the position of the seatbelt assembly.

19. The assembly of claim 18, further comprising instructions to lock the seatbelt assembly in the position corresponding to the position of the wheelchair.

20. The assembly of claim 18, further comprising instructions to lock the seatbelt buckle in the position corresponding to the position of the seatbelt assembly.

* * * * *